Figure 1:
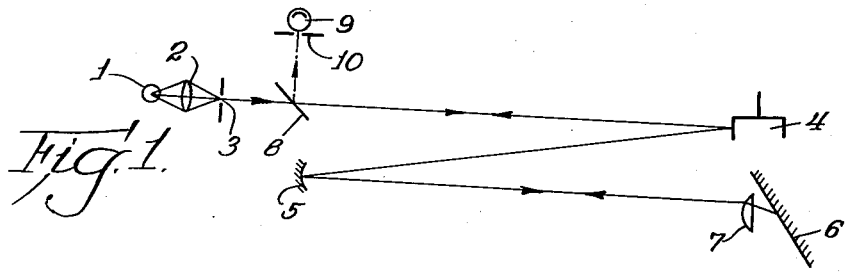

Nov. 6, 1962 E. SICK 3,062,965
PHOTOELECTRIC SCANNING DEVICE
Filed July 28, 1960 3 Sheets-Sheet 1

INVENTOR.
Erwin Sick
BY
Jones, Darke & Robertson
Att'ys.

Nov. 6, 1962  E. SICK  3,062,965
PHOTOELECTRIC SCANNING DEVICE
Filed July 28, 1960  3 Sheets-Sheet 2
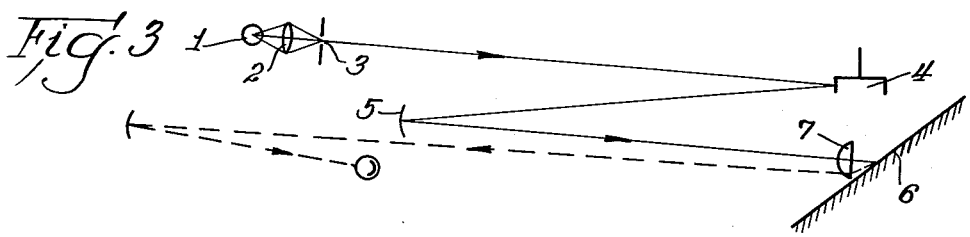
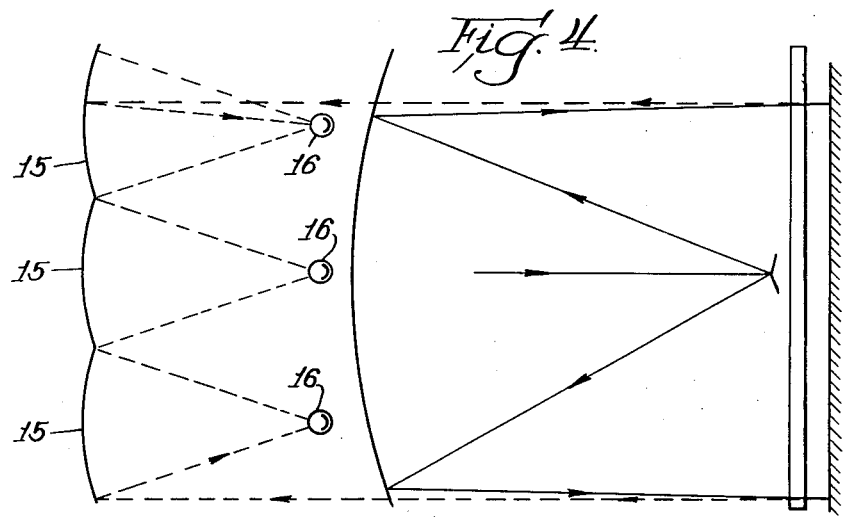
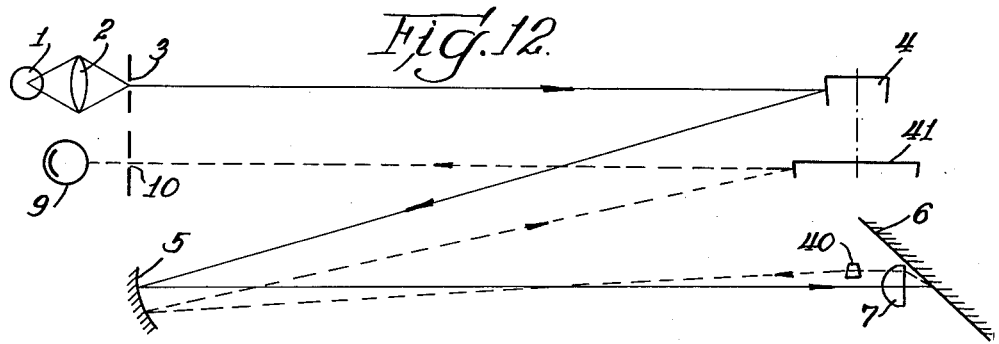
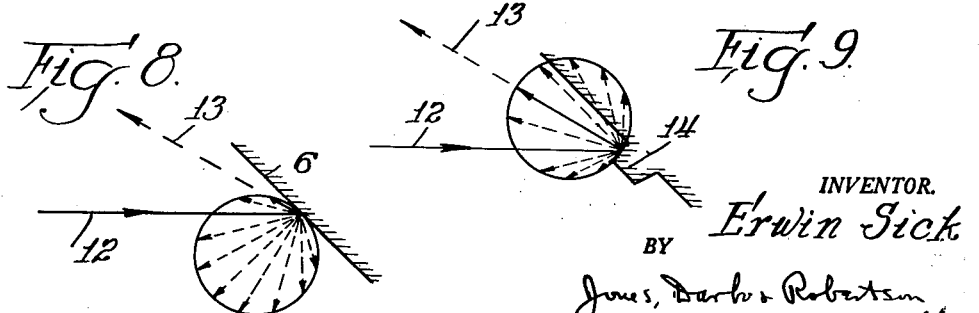
INVENTOR.
Erwin Sick
BY
Jones, Barby & Robertson
Att'ys.

Nov. 6, 1962  E. SICK  3,062,965
PHOTOELECTRIC SCANNING DEVICE
Filed July 28, 1960  3 Sheets-Sheet 3

INVENTOR.
Erwin Sick

United States Patent Office 3,062,965
Patented Nov. 6, 1962

3,062,965
PHOTOELECTRIC SCANNING DEVICE
Erwin Sick, Irschenhausen Post Office, Ebenhausen
(Isartal), Germany
Filed July 28, 1960, Ser. No. 45,867
Claims priority, application Germany July 31, 1959
15 Claims. (Cl. 250—236)

This invention is concerned with a device for the scanning for defects of passing-by diffusedly reflected surfaces, wherein the surfaces are scanned line by line by a focused beam of rays oscillating in one plane.

This application is a continuation-in-part of previously filed copending application Serial No. 782,578, filed December 23, 1958, for Photoelectric Apparatus by the present applicant, and issued February 14, 1961 as U.S. Patent 2,971,695.

An object of the invention is to design a scanning device of the type described, in such a manner that both spots and wrinkles of the goods to be scanned are reliably detected and which device produces a perfect photoelectric signal. In particular, the invention has as its object the provision of a photoelectric scanning and testing device for paper strips or paper sheets of high-quality paper grades. Such an examination has until now been carried out by workmen who have visually inspected the paper sheet by sheet for defects and, by hand, sorted out the defective pieces. This is a very circumstantial and time-consuming method which, moreover, is subject to considerable uncertainty. Defects may be easily overlooked with this method. With the inclusion of even a single defective sheet, the value of a whole paper shipment can be materially decreased, since, when the customer requires one hundred percent faultless paper, he is compelled to re-examine and to re-sort the shipment.

Considerable optical difficulties are involved in the carrying out of such an examination by photoelectric scanning means. The surfaces to be scanned are comparatively wide. The scanning beam of rays must be focused over the whole width of these surfaces exactly in the plane of the goods to be scanned. The light spot generated on the surface to be scanned must not be substantially larger than the spots or wrinkles to be detected, since the percentage change of intensity upon passing over a spot or wrinkle would otherwise be too small to produce a sufficient photoelectric impulse.

Furthermore, with the scanning of paper sheets or the like the photoelectric detector only picks up the light diffusedly reflected into a relatively narrow solid angle. This luminous flux is, as a rule, sufficiently large only when the scanning beam of rays produces a very sharp light spot on the goods under examination. Until now, these difficulties have been a bar to the use of photoelectric scanning for the testing and examination of paper sheets or for similar applications where the scanning of wide surfaces is involved.

For the purposes of scanning wide surfaces, according to the invention, the scanning beam of rays is directed through a concave mirror which is curved in such a manner as to effect levelling of the surfaces of sharp focusing, and the focal point of the beam of rays is imaged on a radiation detector arrangement. Levelling of the surface of sharp focusing enables the scanning beam of rays to be focused sharply in the plane of the paper under test through its whole path. A particularly sharp light spot is obtained if, in further development of the invention, the scanning beam of rays is focused by optical means which produce an image of an entrance slit extending in the direction of course of the goods to be scanned, substantially in the running plane of the goods, which image is contracted to a point by a cylinder lens extending diagonally thereto over the scanning width. Further, the cylinder lens is advantageously positioned immediately in front of the surface to be scanned. For reasons of exactness, it is also advantageous to arrange the concave mirror at a short distance from the surface to be scanned.

Furthermore, the invention has as an object the provision of a scanning device which produces a distinct and sharp impulse on the occurrence of wrinkles.

According to the invention this is achieved as a result of the fact that the scanning beam of rays hits the surface to be scanned at an acute angle. Then upon occurrence of a wrinkle the angle of incidence of the beam of rays and thereby the diameter of Lambert's circle is changed. This change is relatively large because of the oblique incidence and effects a corresponding change of the luminous flux received by the radiation detector arrangement. If, then, according to the invention, the imaging of the focal point on the radiation detector arrangement is effected through a beam of radiation diaphragmed out of the diffusedly reflected radiation, this influence is still superimposed by the influence of the tilting of Lambert's circle caused by the wrinkle. This influence acts in the same manner if the image is produced by a beam of radiation that is reflected almost glancingly. This will be explained hereinbelow.

Figure 2:
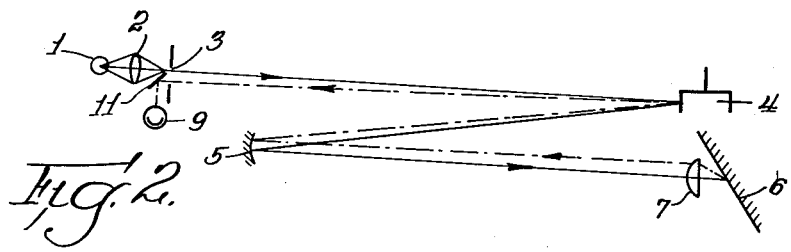
Figure 5:
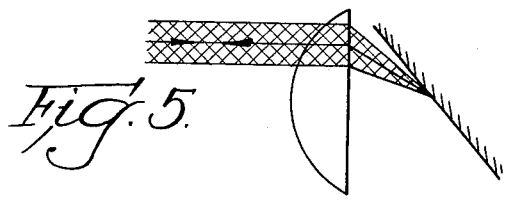
Figure 6:
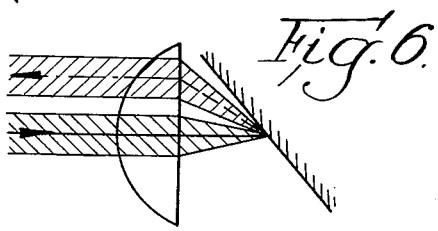
Figure 7:
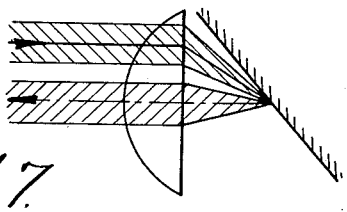
Figure 10:
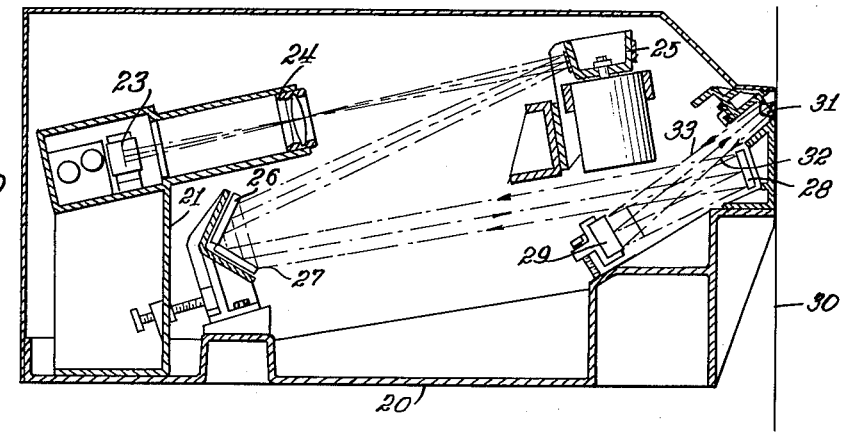
Figure 11:
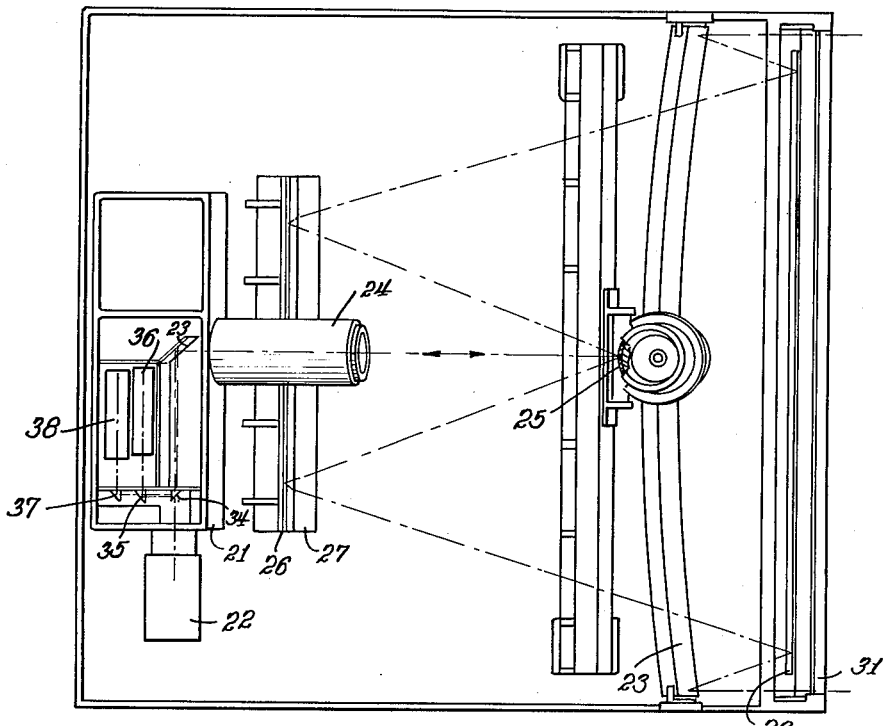

Several embodiments of the invention are described in detail in the specification and shown in the accompanying drawings in which:

FIG. 1 shows schematically the path of rays of one embodiment of the invention;
FIG. 2 shows a second embodiment of the invention;
FIG. 3 shows a third embodiment of the invention in side elevation;
FIG. 4 is a plan view of the embodiment shown in FIG. 3;
FIG. 5 shows in greater detail the course of the beam of rays in the vicinity of the surface to be scanned with the embodiment of FIG. 1;
FIG. 6 shows in corresponding manner the course of the beam of rays with the embodiment of FIG. 2;
FIG. 7 shows a modification of the course of rays according to FIG. 6;
FIGS. 8 and 9 illustrate the effect of a wrinkle in a surface to be scanned;
FIGS. 10 and 11 show in side elevation and in plan view the constructional design of a fourth arrangement according to the invention.
FIG. 12 shows a fifth embodiment of the invention.

Referring now to FIG. 1, reference numeral 1 designates a light source illuminating a slit 3 through a condenser lens 2. The slit 3 is imaged in a manner not shown in detail on a surface 6 under test via a rotating polygonal mirror 4 and a concave mirror 5. The image of the slit is contracted to a sharp spot by a cylinder lens 7 extending diagonally over the surface 6. The beam of rays hits the surface 6 obliquely at an acute angle, as can be more clearly seen in FIG. 5. In the path of rays, a semi-transparent mirror 8 is arranged, which receives the diffusedly inversed light and directs it to a photocell or the like 9 arranged behind a slit 10. The mirror 5 also extends over the whole width of the surface 6 to be scanned and is curved in such a manner as to effect a levelling of the surface of sharp focusing over the entire with of the surface 6. For this purpose the mirror 5 can be devised as a parabolic mirror in the focal plane of which the polygonal mirror 4 is situated.

With the embodiment of FIG. 2, wherein like parts are designated by like reference numerals, instead of the semi-transparent mirror 8, a mirror 11 is provided for, which is arranged behind a part of the slit 3 and directs the radiation passing through this part of the slit 3 to the photocell 9. Thus the photocell 9 does not pick up that part of the beam of rays which is diffusedly reflected into itself by the surface 6, but rather, a part of the beam of rays which is reflected almost glancingly, as can best be seen from FIG. 6. Here, too, a levelling of the surface of sharp focusing takes place.

The effect of the oblique light incidence on the sensitivity of the arrangement and the distinguishability of wrinkles is evident from FIGS. 8 and 9. Reference numeral 12 designates the direction of the incident beam of rays, and 13 designates the direction of the beam of rays that is detected by the photocell 9 out of the diffusedly reflected radiation. As is well known, the following relations are valid for diffused reflection: if $J_0$ is assumed ot designate the liminous density in a direction perpendicular to the diffusedly reflecting surface, then the luminous density $J(\alpha)$ in a direction forming an angle with the surface normal is $$J(\alpha) = J_0 \cos \alpha \text{(Lambert's law)}$$

If $J(\alpha)$ is plotted in polar coordinates as a function of a circle, Lambert's circle is obtained. Lambert's circle is represented in FIG. 8 for the case of a flat surface without wrinkles. It can be seen therefrom that, in the direction of the ray 13, only a very small luminous density is effective. The photocell 9 is impinged upon only by a small luminous flux. If, however, as shown in FIG. 9 a wrinkle 14 occurs, Lambert's circle is tilted together with the surface normal, so that a strong luminous density is effective in the direction 13. At the same time the diameter of Lambert's circle is increased (not shown in the drawing), because the ray hits the wrinkle 14 under a larger angle of incidence than the plane surface 6. Both these influences act in the same sense, so that a relatively strong change of the luminous flux takes place on the photocell 9. This change results in a correspondingly strong photoelectric impulse. This impulse can in any manner (not shown here) effect appropriate switching operations, e.g. switch on a defect indicator or control a sorting-out mechanism. This depends upon the specific requirements and is within the discretion and the knowledge of those skilled in the art.

It must be noted here that the expressions "strong" changes or luminous flux and "strong" photoelectric impulse are to be understood cum grano salis. In fact what is here involved is a matter of extremely weak signals, as will be apparent to those skilled in this particular field, and the expression "strong" refers to the ratio to signals which can be obtained by conventional methods and which are not adapted for a perfect photoelectric scanning of paper strips or sheets.

The same effect as encountered with the structures of FIGS. 2 and 6, as explained with reference to FIGS. 8 and 9, occurs also in the arrangement of FIGS. 1 and 5.

In FIG. 7, the positions of the incident and the reflected beam of rays are interchanged from the arrangement shown in FIG. 2. In this arrangement, substantially the only effect used is the one where, in the case of wrinkling, the diameter of Lambert's circle is enlarged due to steeper light incidence.

Whereas in the embodiments according to FIGS. 1 and 2 the focal point of the scanning beam is being imaged through the polygonal mirror 4 on a photoelectric cell arranged near the light source, FIGS. 3 and 4 show another solution. Herein, the beam of rays passing through under the concave mirror 5 from the diffusedly reflected radiation is directed through the concave mirror 15 into photoelectric cells 16. By this manner, a larger flow of light can be picked up, an important consideration in view of the very weak signals.

For the purpose of simplification the radiation detectors are shown as photoelectric cells in FIGS. 1 to 4. In practice, secondary-electron-multiplier tubes are preferably used for the purpose of obtaining a higher sensitivity.

A specific construction of the invention is illustrated in FIGS. 10 and 11.

In a casing 20 a light source 22 is provided on a base 21, which directs a beam of rays through a deflecting mirror and a slit 23 onto an objective 34. Through a polygonal mirror 25, reflecting mirrors 26, 27, 28 and a concave mirror 29, the objective 24 produces an image of the slit 23 approximately in the plane of a passing-by paper strip 30 which image is contracted to a point by a cylinder lens 31 arranged directly in front of the paper strip 30 and extending over the whole range thereof. The curvature of the concave mirror 29 is so chosen that it levels the surface of sharp focusing of the image. The concave mirror is arranged relatively closely to strip 30 and acts in a manner similar to that of a field lens. It has been proven that with such an arrangement a light spot can be produced the diameter of which measures less than a tenth of a millimeter, and, upon the rotation of the polygon mirror 25 travels periodically in a rapid order over the whole width of the paper to be scanned without changing its size and shape. Through the optical system 24 the cylinder lens 31 on the other hand is imaged on the slit 23 through mirrors 29, 28, 27, 26 and the rotating polygon mirror 25. The cylinder lens 31, however, collects the light diffusedly reflected by the paper 30 which is thus collected on slit 23. As a result the light appears through the upper part of the slit, that is, being reflected by the lower part of the cylinder lens (beam 32) and the light through the lower part of the slit, which is picked up by the upper part of the cylinder lens (beam 33). Through a semi-permeable mirror 34 the reflected light is laterally being directed from the path of rays between slit 23 and the light source 22. The light entering through the upper part of slit 23 travels through a mirror 35 to an electron-multiplier tube 36, and the light, appearing through the lower part of slit 23, through a mirror 37 to an electron-multiplier tube 38. The paper strip 30 lies exactly vertically, whereas the scanning beam hits the strip, directed obliquely towards above. As can be seen from FIG. 10, the diffusedly reflected radiation is principally picked up by the secondary electron-multiplier tube 36, which is being reflected glancingly (beam 32), whereas the secondary electron-multiplier tube 38 is being impinged upon by the radiation which is being reflected almost vertically to the paper plane (beam 33). It has been proven and is further quite obvious from FIGS. 8 and 9, that the beam 32 is particularly adequate for recognizing the wrinkles. Beam 33 is scarcely influenced by wrinkles, however, but very strongly by spots.

The embodiment of FIG. 12 is a modification of the embodiment according to FIG. 2 and has for its object to have more reflected light impinging upon the photoelectric cell 9. For this purpose the beam of rays diffusedly reflected in a glancing manner is deviated by a wedge 40 so that it hits on another section of mirror 5 and is reflected therethrough unto a second separate polygonal mirror 41. Mirror 41 which is mounted on the same shaft as mirror 4, has, however, a larger diameter and therefore receives more light. The polygonal mirror 41 reflects the beam of rays offset with respect to the incident beam of rays directly onto the slit 10 and photoelectric cell 9. The partly transparent mirror and the light loss resultant therefrom are obviated.

The invention has been explained by way of a few preceding embodiments. However, these embodiments are not to be construed as embodying a complete description of all solutions possible for an expert, and shall neither limit nor restrict the scope of the protection.

Invention is claimed as follows:

1. An apparatus for detecting light reflectivity changes on a wide surface by scanning said surface with a sweeping light beam, which comprises a light source, means for forming a narrow beam of light from said source comprising an entrance slit and optical means for producing an image of said slit substantially in the running plane of said surface extending in the direction of the course of said surface and having a cylindrical lens extending diagonally to said surface over the scanning width for contracting said slit image to a point, means for sweeping said light beam across said surface, photoelectric means, means for directing the image reflected from said surface to said photoelectric means, and means connected with said photoelectric means for registering current conduction changes therein.

2. An apparatus according to claim 1 wherein said cylindrical lens is arranged directly in front of said surface to be scanned.

3. An apparatus according to claim 1 wherein said means for sweeping said light beam across said surface comprises a conical polygonal mirror and means for rotating said mirror.

4. An apparatus according to claim 1 having a plane reflecting mirror so arranged to reflect the beam from said means for sweeping said light beam to said concave mirror.

5. An apparatus according to claim 4 wherein said plane reflecting mirror and said concave mirror are arranged to reflect said light beam at acute angles to the direction of incidence so that the rays falling on said reflecting mirror and the rays being reflected from said concave mirror intersect.

6. An apparatus according to claim 1 having an inclined semi-transparent mirror so arranged in the path of said light beam that the beam reflected from said surface to be scanned is directed thereby to said photoelectric means.

7. An apparatus according to claim 1 having a concave mirror arranged at a short distance from the surface of said surface to be scanned.

8. An apparatus for detecting light reflectivity changes on a wide surface by scanning said surface with a sweeping light beam, which comprises a light source, means for forming a narrow beam of light from said source, means for directing said light beam against said surface at an acute angle thereto, means for focusing said light beam in the plane of said surface, means for sweeping said light beam across said surface, photoelectric means, means for directing the image reflected from said surface to said photoelectric means, and means connected with said photoelectric means for registering current conduction changes therein.

9. An apparatus according to claim 8 wherein said means for focusing said light beam in the plane of said surface comprises a concave mirror.

10. An apparatus according to claim 8 having a diaphragm for limiting the portion of the reflected light beam directed to said photoelectric means.

11. An apparatus according to claim 9 wherein said light beam is directed against said surface to be scanned at an acute angle sufficiently small so that the image obtained from said surface is almost a glancingly reflected beam of rays.

12. An apparatus according to claim 8 wherein said means for forming a narrow beam of light comprises an entrance slit, and having a separate photoelectric means positioned behind both the upper and the lower part of said entrance slit.

13. An apparatus according to claim 8 wherein said photoelectric means is a secondary-electron-multiplier tube.

14. A device according to claim 11 characterized in that the beam of rays reflected in a glancing manner is deviated by optical means, in particular by a refracting wedge, and is directed to a second polygonal mirror having the same number of mirrors as the first polygonal mirror and rotating coaxially therewith, and that the reflected beam of rays, thus offset with respect to the incident beam of rays, directly hits an exit slit arranged above or below the entrance slit, a radiation detector being arranged behind this exit slit.

15. A device according to claim 14, characterized in that the second polygonal mirror has a larger diameter than the first one.

References Cited in the file of this patent

UNITED STATES PATENTS

| | | |
|---|---|---|
| 2,315,282 | Snow | Mar. 30, 1943 |
| 2,410,550 | Padva | Nov. 5, 1946 |
| 2,769,374 | Sick | Nov. 6, 1956 |
| 2,813,203 | Machler | Nov. 12, 1957 |
| 2,971,695 | Sick | Feb. 14, 1961 |